No. 650,209. Patented May 22, 1900.
J. WHITE.
PROTECTIVE HOLLOW ILLUMINATING TILE.
(Application filed Apr. 14, 1899.)
(No Model.)
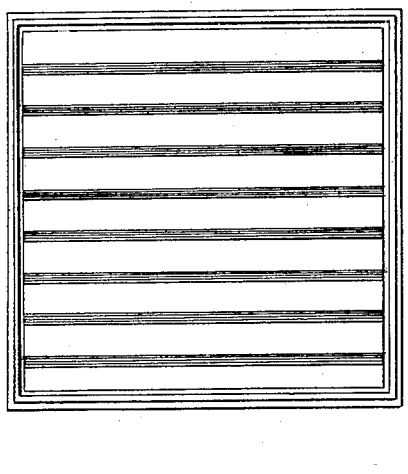
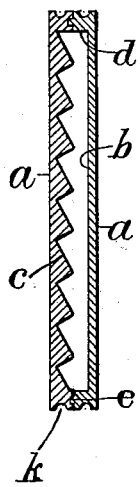
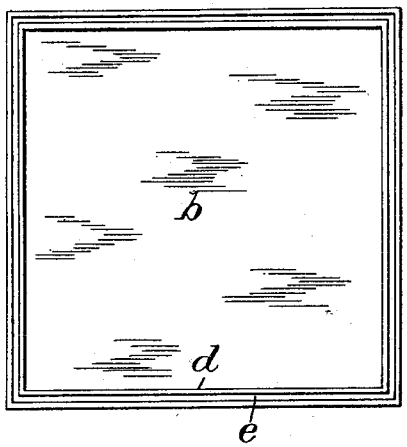
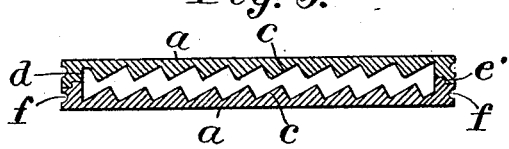
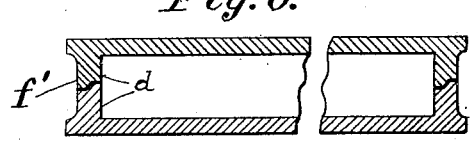
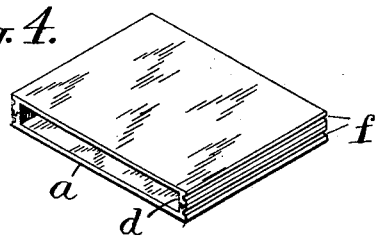
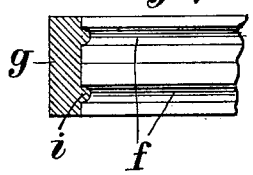
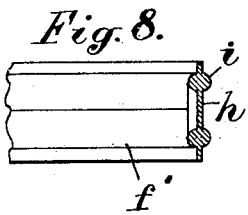
Attest:
L. Lee.
Edw. F. Kinsey.
Inventor.
James White, per
Thomas S. Crane, Atty.
THE NORRIS PETERS CO., PHOTO-LITHO., WASHINGTON, D. C.

UNITED STATES PATENT OFFICE.

JAMES WHITE, OF NEW YORK, N. Y.

PROTECTIVE HOLLOW ILLUMINATING-TILE.

SPECIFICATION forming part of Letters Patent No. 650,209, dated May 22, 1900.

Application filed April 14, 1899. Serial No. 712,998. (No model.)

*To all whom it may concern:*

Be it known that I, JAMES WHITE, a citizen of the United States, residing at New York, (Brooklyn,) Kings county, New York, have invented certain new and useful Improvements in Protective Hollow Illuminating-Tiles, fully described and represented in the following specification and the accompanying drawings, forming a part of the same.
The object of this invention is to furnish an improved construction for a tile having an interior cavity, whereby the conduction of heat through the tile may be prevented; and this object is attained by forming the tile in two parts, having integral marginal ribs to form a joint and separate the walls by an air-space. The two parts contact only at the edges of the integral ribs where they are united, so as to wholly and tightly inclose the air-space.
By the present invention a hollow tile adapted to transmit light without refraction can be cheaply constructed and employed in the place of solid-glass panes for the glazing of window-sashes. Such hollow tiles having each an inclosed air-space not only prevent the conduction of cold or heat, but have been proved by experience to be less readily broken by fire, and therefore furnish a material protection against the spread of flames.
In the present invention the tile is divided at the edges, making the cavity in each part very shallow, and the parts may thus be readily pressed into shape in a mold like other glassware. The edges of one or both of the parts are provided with the continuous jointing-rib to form the interior cavity, and the edges are united together in such manner as to exclude dust and, if necessary, moisture. Where the two jointing-ribs are brought together to form the joint between the parts, a rabbet or tongue and groove is formed upon the adjacent faces of the ribs to hold the parts in alinement and to assist in forming a close joint with a suitable cement. The opposite faces of the inner cavity may be made with a plane surface, or one or both of such faces may be provided with a series of prism projections; but the exterior of the tile is preferably smooth and flat, so as to be readily combined with others to form a window pane or refractor with smooth exterior, which is liable to retain very little dust and can be readily cleaned. The tile may have a groove upon the margin of each tile part to engage separate ribs in the supporting-frame, so that the frame may hold the parts together.

The invention will be understood by reference to the annexed drawings, in which—

Figure 1 is a plan of one of the tile parts having prism-ridges within its cavity. Fig. 2 is a plan of the opposite part having a plane inner surface. Fig. 3 is a cross-section of the complete tile with a portion of the sash to support the same. Fig. 4 is a perspective view of a tile cut open at one edge and having inner plane surfaces. Fig. 5 is a cross-section of a tile having corrugated faces upon the opposed sides to form the prism-ridges. Fig. 6 is a cross-section of a tile having a wide groove in the edges to clear the ribs in the frame. Fig. 7 is an end view of a part of a doubly-grooved tile with a section of the outer frame-bar. Fig. 8 is a view of part of the tile with a wide groove, as shown in Fig. 6, with one of the mullion frame-bars. Fig. 6 is broken for want of room upon the drawings. Fig. 4 is drawn upon half the scale of the previous figures, and Fig. 6 is drawn upon twice the scale of Fig. 5.

The outer sides $a$ of the tile parts are made flat and smooth, as shown in the drawings. The inner face is shown smooth and parallel with the outer face at $b$ in Figs. 3 and 4 and corrugated to form prisms at $c$ in Figs. 3 and 5. The edges of both parts are shown in Fig. 3 provided with ribs $d$, the opposed faces of which are provided, respectively, with a tongue $e$. In Fig. 5 the ribs are provided with external and internal rabbets $e'$, and either the rabbet or tongue $e$ extends across the joint of the tile, so as in practice to exclude dust from the internal cavity, and thus prevent the inner faces from becoming clouded or dirty. The contiguous edges of the ribs are preferably cemented together, which makes the joint not only impervious to dust, but to moisture. The rabbet $e'$ and tongue $e$ both form shoulders, which serve to center the tile parts upon one another or to hold them in proper alinement and which also serve to prevent displacement of the two parts upon one another when handled in manufacture and transportation. Each of the tile parts is shown provided upon two opposite edges with a groove $f$, which is adapted to engage a rib upon the inner edge of the frame or sash in which the tile is supported. The marginal bar of such a frame is shown at $g$ in Fig. 7 with two ribs $i$ fitted to the groove $f$ upon the two tile parts. With such a frame the tiles are fitted within the proper spaces of the frame before the frame is joined at the corners, and the ribs hold the tiles firmly in place, while they positively prevent the separation of the tile parts from one another in each of the tiles.

To replace a tile having a groove upon each tile part engaged with a separate rib upon the frame, it would be necessary to separate the frame-bars, which would be very inconvenient in practice. The two-part tile may for emergencies be constructed for insertion in the frame without separating the frame-bars by forming the edge of the tile with a wide groove $f'$, as shown in Fig. 6, adapted to embrace both of the ribs, which enables the two parts of the tile to be pressed into the frame from opposite sides, with cement upon the edges of the ribs, so that when pressed together they may adhere, and thus be held in place. The wide groove $f'$ is formed partly in one of the tile parts and partly in the other adjacent to the joint of the parts, so as to form a common recess or groove in the edge of the complete tile. Such groove is wide enough to embrace both of the ribs $i$, but does not engage with their inner or adjacent sides, and the parts may thus be inserted in the frame without removing the frame-bars. Fig. 8 shows such tile parts united together in contact with the ribs upon one of the mullion-bars $h$. If the joint of the tile parts becomes loosened in this latter construction, the ribs upon the frame fail to hold the parts in place, and the tile with the wide groove $f'$ is therefore intended only for use in emergencies to replace tiles which are broken from the frame.

Where cement is inserted in the joint of the two-part tile to make the cavity impervious to moisture, it is obvious that the interior is entirely protected from any deposition of moisture from the atmosphere. The tile is thus particularly adapted for use in the windows of cold-storage warehouses and in many offices where a transparent glass is desired through which objects can be fully distinguished and where a material difference of temperature upon the two sides of the glass is liable to cause precipitation. The tile having flat parallel walls, as shown in Fig. 4, transmits the light without refraction and the nonconducting property of the air within the tile greatly retards the transmission of heat through the same, and thus maintains the inner side of the tile at the temperature of the apartment independent of the temperature upon its outer side. The smooth outer sides of the tile are readily cleansed when mounted in a suitable frame and are not so liable to retain or accumulate dirt as a corrugated surface. The tile thus possesses many advantages in use, while the exceedingly-shallow recess which is required in each of the two parts permits the molding of the integral ribs upon the tile parts with the greatest possible facility when made of pressed glass or analogous material. Tests have demonstrated that window-glazing with two plates and an intervening air-space is a wonderful resistant of heat, and the double-walled tile thus affords in case of fire a very effective safeguard against the spreading of flames through windows or glazed doors.

I am aware that hollow-glass building-blocks blown in one piece are old; but such blocks have an open neck, while mine are entirely closed.

I am aware that flat panes of glass have been used to form an air-chamber by joining the panes at the edges by strips of cemented material; but such material is not of glass, like the ribs in my construction, and is therefore liable to disintegration, while my integral ribs are as durable as the body of the tile. The ribs also furnish material of dimensions adapted to receive the groove on the tile parts, and they can thus be held in a frame by mere engagement with the same and require no putty to secure them, like flat panes or plates of glass. The shallow ribbed tile parts are formed only by pressing and require no blowing whatever, and as their manufacture is thus very cheap and rapid I have made a claim to the pressed and ribbed tile part with the rib around its entire margin as a new article of manufacture.

Having thus set forth the nature of the invention, what is claimed herein is—

1. A glass tile having two parts wholly separated by an interior air-space, and each part provided with a marginal rib, and engaging shoulders upon the ribs to form a dust-proof joint.

2. A two-part glass tile for light-transmission without refraction, each part having flat parallel walls and provided around its margin with an integral jointing-rib, and having shoulders to center the parts upon one another.

3. The glass tile herein shown and described, having two parts $a$ separated by an air-space, and each of such parts being provided with a marginal rib $d$ grooved upon the outer side to engage ribbed frame-bars, substantially as herein shown and described.

4. The glass tile having two parts separated by an air-space, and each part provided with the integral marginal rib $d$, the ribs having engaging shoulders where in contact to center the parts upon one another, and the edges of the tile being provided with the broad groove $f'$ extended across the joint of the parts and along the opposite edges of the tile, whereby it is adapted for application to frame-bars having ribs, substantially as herein set forth.

In testimony whereof I have hereunto set my hand in the presence of two subscribing witnesses.

JAMES WHITE.

Witnesses:
EMILE HENKEL,
C. H. BEBEE, Jr.